US012535493B2

United States Patent
Iwamatsu et al.

(10) Patent No.: US 12,535,493 B2
(45) Date of Patent: Jan. 27, 2026

(54) AUTOMATIC ANALYZER

(71) Applicant: Hitachi High-Tech Corporation, Tokyo (JP)

(72) Inventors: Tomoaki Iwamatsu, Tokyo (JP); Takenori Okusa, Tokyo (JP); Tsukasa Suenari, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 567 days.

(21) Appl. No.: 18/011,956

(22) PCT Filed: Feb. 12, 2021

(86) PCT No.: PCT/JP2021/005311
§ 371 (c)(1),
(2) Date: Dec. 21, 2022

(87) PCT Pub. No.: WO2022/024425
PCT Pub. Date: Feb. 3, 2022

(65) Prior Publication Data
US 2023/0408539 A1 Dec. 21, 2023

(30) Foreign Application Priority Data

Jul. 29, 2020 (JP) ................................. 2020-128176

(51) Int. Cl.
*G01N 35/10* (2006.01)
*B01L 9/00* (2006.01)
(Continued)

(52) U.S. Cl.
CPC ............... *G01N 35/10* (2013.01); *B01L 9/06* (2013.01); *B01L 9/54* (2013.01); *B01L 9/543* (2013.01);
(Continued)

(58) Field of Classification Search
CPC ......... G01N 35/10; G01N 2035/00306; G01N 2035/00801; G01N 2035/1027;
(Continued)

(56) References Cited

U.S. PATENT DOCUMENTS

| 5,507,410 A | 4/1996 | Clark et al. |
| 8,087,735 B1 | 1/2012 | Rheault et al. |

(Continued)

FOREIGN PATENT DOCUMENTS

| CN | 105452872 A | 3/2016 |
| CN | 110235000 A | 9/2019 |

(Continued)

OTHER PUBLICATIONS

International Search Report of PCT/JP2021/005311 dated Apr. 27, 2021.
Chinese Office Action received in corresponding Chinese Application No. 202180047551.1 dated Sep. 4, 2025.

*Primary Examiner* — Benjamin R Whatley
(74) *Attorney, Agent, or Firm* — MATTINGLY & MALUR, PC (57) ABSTRACT

An automatic analyzer maintains accuracy of analysis of a specimen even when a liquid spills on an expendable item case. The automatic analyzer has an expendable item case which accommodates expendable items including a dispensing tip used for dispensing a specimen and a reaction cell used for reaction between the specimen and a reagent, and a conveyance portion which conveys the expendable items from the expendable item case. A body cover covers the analysis unit, the expendable item case, and the expendable item conveyance portion. The expendable item case includes a tray in which the expendable items are arrayed, and an expendable item cover which covers the tray and in which an open portion through which the expendable item conveyance portion passes is provided on a side surface thereof, (Continued)

and the expendable item cover includes a barrier portion protruding upward at an end on a side of the open portion.

15 Claims, 5 Drawing Sheets

(51) Int. Cl.
*B01L 9/06* (2006.01)
*G01N 35/00* (2006.01)

(52) U.S. Cl.
CPC .............. *G01N 2035/00306* (2013.01); *G01N 2035/00801* (2013.01); *G01N 2035/1027* (2013.01)

(58) Field of Classification Search
CPC . G01N 2035/00277; G01N 2035/0401; G01N 2035/103; G01N 35/04; B01L 9/06; B01L 9/54; B01L 9/543
See application file for complete search history.

(56) References Cited

U.S. PATENT DOCUMENTS

| | | |
|---|---|---|
| 2002/0108857 A1 | 8/2002 | Paschetto et al. |
| 2006/0002820 A1 | 1/2006 | Baumann et al. |
| 2013/0132006 A1* | 5/2013 | Gwynn .................... B01L 3/021 702/55 |
| 2016/0195562 A1 | 7/2016 | Oonuma et al. |
| 2019/0094253 A1* | 3/2019 | Hirama ................ G01N 35/025 |
| 2019/0361041 A1* | 11/2019 | Sasaki ..................... G01N 35/04 |
| 2021/0063423 A1* | 3/2021 | Yamashita ............. G01N 35/04 |
| 2021/0356482 A1* | 11/2021 | Moffitt ............... B65D 43/0214 |

FOREIGN PATENT DOCUMENTS

| | | |
|---|---|---|
| JP | 2000-221200 A | 8/2000 |
| JP | 2003-177138 A | 6/2003 |
| JP | 2004-528531 A | 9/2004 |
| JP | 2006-17727 A | 1/2006 |

* cited by examiner

AUTOMATIC ANALYZER

TECHNICAL FIELD

The present invention relates to an automatic analyzer.

BACKGROUND ART

An automatic analyzer is a device which analyzes a specific component contained in a specimen such as blood or urine provided from a patient, and is used in a hospital and a detection agency. A dispensing tip used for dispensing a specimen and a reaction cell used for reaction between a specimen and a reagent are treated as an expendable item that is thrown away for preventing the inclusion of a foreign substance. The dispensing tip is accommodated in a case for expendable items or the like.

Patent literature 1 discloses a tip accommodating case which includes: a tip holding plate on which a plurality of dispensing tips are held; a body portion that is a square or rectangular box, the box provided with an opening in which the tip holding plate is fitted on an upper side thereof; and a lid portion that is openable and closable, the lid portion provided with an opening in which the body portion is fitted.

CITATION LIST

Patent literature: Japanese Unexamined Patent Application Publication No. 2000-221200

SUMMARY OF INVENTION

Technical Problem

However, in patent literature 1, it is necessary to open a lid portion to take out a dispensing tip. Accordingly, to realize automatic conveyance of n expendable item such as the dispensing tip, an opening must be provided to at least one surface out of four surfaces of the lid portion. There may be a case where, on an upper surface of the lid portion where the opening is provided to at least one surface out of four surfaces of the lid portion, a reagent container that is exchanged when an operator of an automatic analyzer performs an expendable item exchanging operation, a container that is filled with a washing liquid and is used during a maintenance operation or the like is placed. In such a case, there is a possibility that the reagent container or the like turns down so that a liquid leaks. When the leaked liquid reaches the dispensing tip, the reaction cell or the like disposed in the case for expendable items, the liquid affects accuracy of analysis of a specimen.

Accordingly, it is an object of the present invention to provide an automatic analyzer capable of maintaining analysis accuracy of a specimen even when a liquid leaks on an expendable item case in which an expendable item is accommodated.

Solution to Problem

The present invention that achieves the above-mention object is an automatic analyzer that includes: an analysis unit which analyzes a specimen; an expendable item case which accommodates expendable items including a dispensing tip used for dispensing of the specimen and a reaction cell used for reaction between the specimen and a reagent; a conveyance portion which conveys the expendable items; and a body cover which covers the analysis unit, the expendable item case, and the expendable item conveyance portion. In the automatic analyzer, the expendable item case includes a tray in which the expendable items are arrayed, and an expendable item cover which covers the tray and in which an open portion through which the expendable item conveyance portion passes is provided on a side surface thereof, and a barrier portion protruding upward is provided at an end on a side of the open portion of the expendable item cover.

Advantageous Effect of the Invention

According to the present invention, it is possible to provide the automatic analyzer which can maintain accuracy of analysis of a specimen even when a liquid leaks on an expendable item case in which expendable items are accommodated.

DESCRIPTION OF EMBODIMENTS

Hereinafter, preferred embodiments of an automatic analyzer according to the present invention are described with reference to attached drawings. In the description made hereinafter and the attached drawings, the same symbols are given to constitutional elements having the identical functions and configurations, and the repeated explanation of these constitutional elements are omitted.

Embodiment 1

Figure 1:
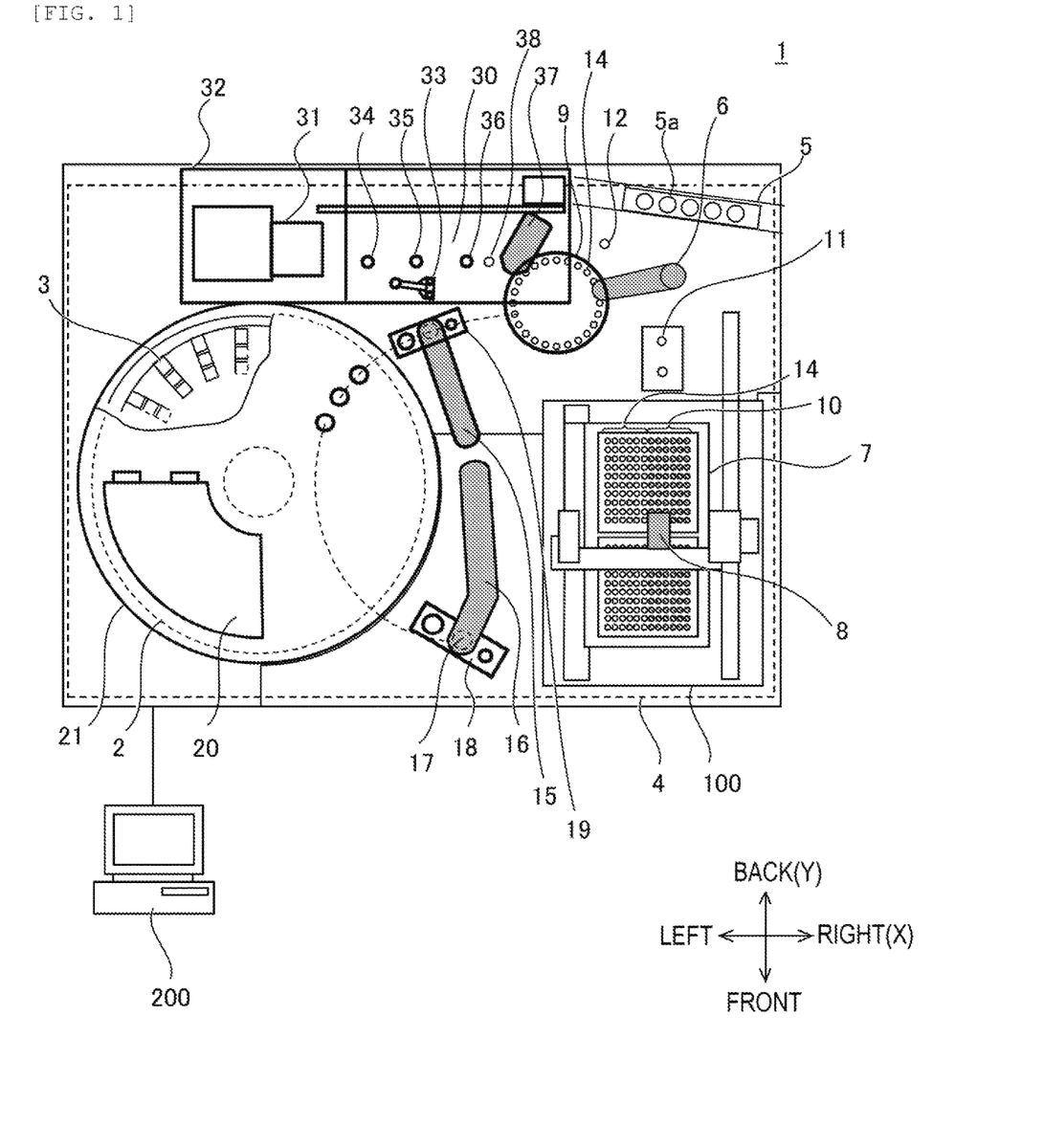
FIG. 1 is a plan view illustrating an example of an overall configuration of an automatic analyzer.
Figure 2:
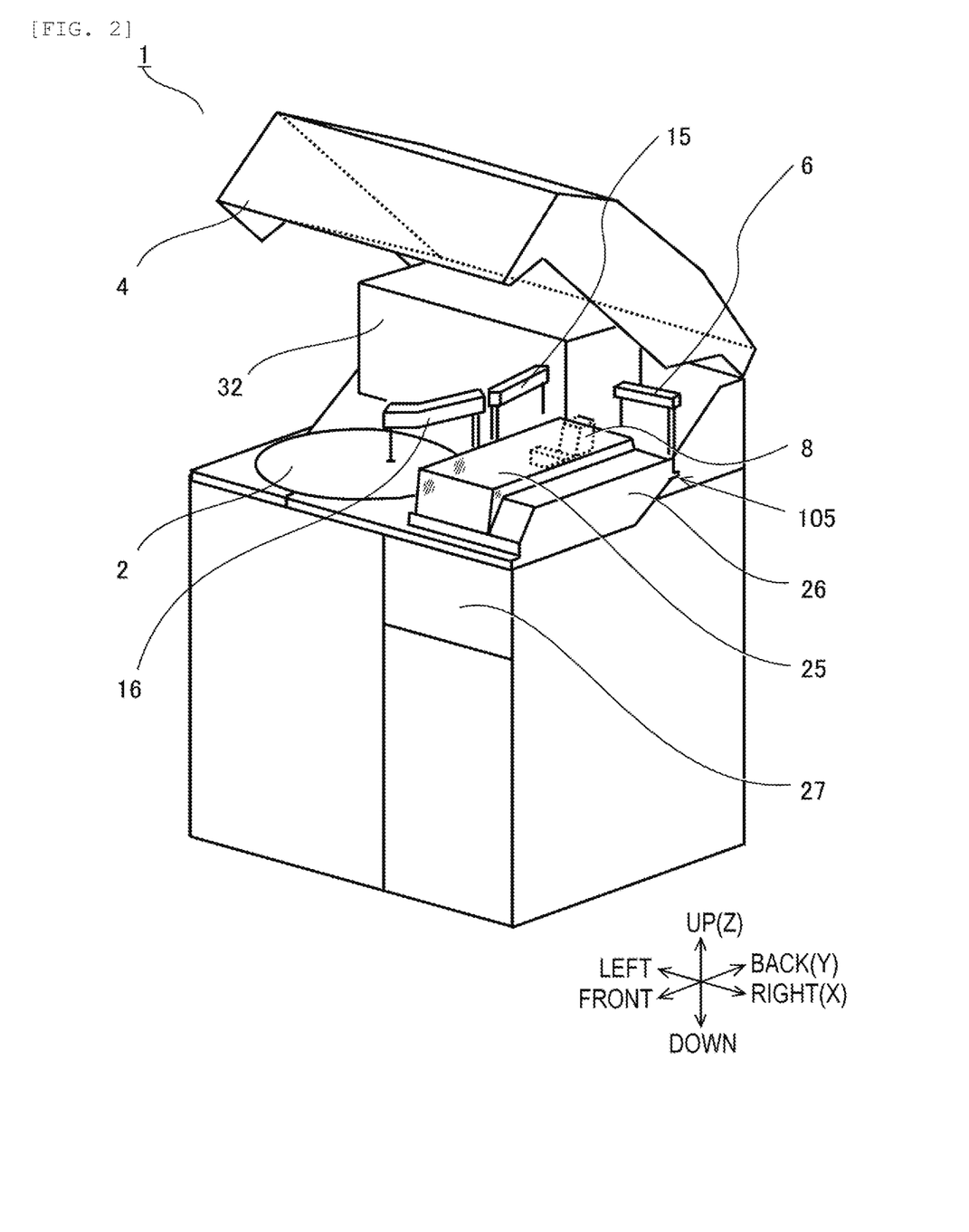
FIG. 2 is a perspective view illustrating an example of the external appearance of the automatic analyzer.

One example of the overall configuration of an automatic analyzer 1 is described with reference to FIG. 1 and FIG. 2. Assume a leftward-rightward direction of the automatic analyzer 1 as an X axis, a frontward-and-rearward direction of the automatic analyzer 1 as a Y axis and upward-downward direction of the automatic analyzer as a Z axis, and the rightward direction, the rearward direction and the upper direction as the normal directions of the respective axes. The automatic analyzer 1 is a device which analyzes a specific component contained in blood, urine or the like provided from a patient. In an immune analysis method that makes use of an immune reaction, a specific component and a marker substance are bonded to each other by an antigen-antibody reaction, and the specific component is subjected to a quantitative analysis or a qualitative analysis using a signal such as an emitted light or absorbed light obtained from the marker substance.

The automatic analyzer 1 includes a specimen conveyance path 5, an expendable item case 100, a reagent disk 2, an incubator 9, a specimen dispensing unit 6, a reagent dispensing unit 15, a stirring portion 16, a B/F separation portion 30, a detection portion 31, a body cover 4, and a control unit 200. Hereinafter, the respective portions are described.

The specimen conveyance path 5 conveys a specimen rack 5a on which a plurality of specimen container each accommodating a specimen are mounted to a position at which a specimen dispensing unit 6 can get access to the specimen. The specimen which is accommodated in the specimen container is dispensed to a reaction cell 14 held by the incubator 9 by the specimen dispensing unit 6.

In the expendable item case 100, reaction cells 14 and dispensing tips 10 that are expendable items are accommodated in a state where the reaction cells 14 and the dispensing tips 10 are arranged on a tray 7. FIG. 1 illustrates a state where the reaction cells 14 are arranged in a left-side half of the tray 7, and the dispensing tips 10 are arranged in a right-side half of the tray 7. The tray 7 on which the reaction cells 14 and the dispensing tips 10 are arranged is put from an expendable item supply port 27 by an operator. The dispensing tip 10 is gripped by an expendable item conveyance portion 8, and is transferred from the tray 7 to a tip buffer 11. Thereafter, the dispensing tip 10 is mounted on a distal end of a nozzle of the specimen dispensing unit 6, and is used for dispensing the specimen. The dispensing chip 10 is exchanged each time the specimen dispensing unit 6 dispenses the specimen for preventing the intrusion of the specimen, and the used dispending tip 10 is discarded to a tip disposal hole 12. A reaction cell 14 is gripped by the expendable item conveyance portion 8, is transferred from the tray 7 to the incubator 9, and is used for accommodating a mixed liquid of a specimen and a reagent. Each time a reaction between the specimen and the reagent is performed and an analysis is performed after the reaction, the reaction cell 14 is also exchanged. The expendable item case 100 is described later with reference to FIG. 3, FIG. 4A and FIG. 4B.

A plurality of reagent container 3 each of which accommodates a reagent is stored in the reagent disk 2. The inside of the reagent disk 2 is held at a temperature lower than a room temperature for reducing the degradation of a reagent. The reagent disk 2 is covered by a reagent disk cover 21. In FIG. 1, to express an arrangement example of the reagent containers 3, a portion of the reagent disk cover 21 is removed. To the reagent disk cover 21, a reagent container loading port 20 is provided for loading and unloading the reagent containers 3. A reagent which is accommodated in the reagent container 3 is dispensed to the reaction cell 14 to which a specimen is dispensed by a reagent dispensing unit 15. The reagent dispensing unit 15 is washed by a reagent nozzle washing portion 19 after the reagent is dispensed. In a case where a reagent which is accommodated in the reagent container 3 contains magnetic beads, before the reagent is dispensed, the reagent is stirred by the stirring portion 16 having a stirring paddle 17 on a distal end thereof. The stirring portion 16 is washed by a paddle washing portion 18 after the reagent is stirred.

The incubator 9 holds a plurality of reaction cells 14 in each of which a mixed liquid of a specimen and a reagent is held. The incubator 9 is held within a range of a target temperature which is a temperature range for causing a reaction of the mixed liquid. By causing the reaction of the mixed liquid over a predetermined time within the range of the target temperature in a step of holding the reaction cell 14 in the incubator 9, a reaction liquid which is used in an analysis is produced. In a case where the incubator 9 has a circular shape illustrated in FIG. 1, the reaction cells 14 are arranged along an edge of an outer periphery of the incubator 9. Along with the rotation of the incubator 9, the reaction cells 14 are transferred to positions that the specimen dispensing unit 6 and the reagent dispensing unit 15 can get access to.

The B/F separation portion 30 includes a conveyance unit 37, a magnetism collecting portion 34, a probe 33, a washing portion 35, and a redispersion portion 36. The B/F separation portion 30 separates a reaction liquid into a reaction product (Bound) and a non-reaction substance (Free). The conveyance unit 37 conveys the reaction cell 14 from the incubator 9 to the B/F separation portion 30, or conveys the reaction cell 14 from the B/F separation portion 30 to the detection portion 31. The magnetism collecting portion 34 collects magnetism of the magnetic beads contained in the reaction liquid so as to separate a reaction product adhering to the magnetic beads from a non-reaction substance. The probe 33 aspirates the non-reaction substance separated from the reaction product and discharges a buffer solution which is used for redispersion of the reaction product. The washing portion 35 washes the probe 33. The redispersion portion 36 disperses the magnetic-collected magnetic beads. The reaction cell 14 which accommodates a solution in which the magnetic beads to which the reaction product adheres are redispersed is conveyed to the detection portion 31 by the conveyance unit 37, and is discarded to a cell disposal hole 38 after the processing in the detection portion 31.

The detection portion 31 includes a light source lamp, a spectrometer, a photomultiplier tube, a photo diode and the like for measuring light emission and absorbance of a solution accommodated in the reaction cell 14 which is conveyed from the B/F separation portion 30. The detection portion 31 may also have a temperature control function for holding the solution at a predetermined temperature. The detection portion 31 is covered by a detection portion cover 32 which also covers the B/F separation portion 30 and a part of the incubator 9.

The body cover 4 accommodates the specimen conveyance path 5, the expendable item case 100, the reagent disk 2, the incubator 9, the specimen dispensing unit 6, the reagent dispensing unit 15, the stirring portion 16, the B/F separation portion 30, the detection portion 31 and the like thus preventing the intrusion of dirt or the like into the automatic analyzer 1 and preventing an operator from being brought into contact with these constitutional elements.

The control unit 200 controls an overall operation of the automatic analyzer 1. The control unit 200 may be a dedicated hardware formed of an application specific integrated circuit (ASIC), a field-programmable gate array (FPGA) or the like, or a micro-processing unit (MPU) which executes a software. An input device and an output device are connected to the control unit 200. Date necessary for an analysis is inputted via the input device such as a keyboard and a mouse, or a touch panel. A result of the analysis is outputted to the output device such as a liquid crystal display or a touch panel.

One example of the expendable item case 100 is described with reference to FIG. 3, FIG. 4A and FIG. 4B. The expendable item case 100 includes the tray 7 described above, an expendable item cover 25, and an enclosing portion 26. The reaction cells 14 and the dispensing tips 10 that are expendable items are arranged on the tray 7.

The expendable item cover 25 covers the tray 7, and includes an open portion through which the expendable item conveyance portion 8 passes on a side surface thereof. In this embodiment, the open portion is provided to a rear side of the expendable item cover 25. The expendable item conveyance portion 8 conveys the reaction cells 14 and the dispensing tips 10 from the tray 7 to the incubator 9 and the chip buffer 11 through the open portion. To allow an operator to check a residual amount of expendable items on the tray 7 by his/he eyes, the expendable item cover 25 may be made of a transparent material, for example, an acrylic resin. At a timing which an operator charges the tray 7, the control unit 200 may perform a residual amount control of the reaction cells 14 or the dispensing tips 10 which are the expendable items.

The enclosing portion 26 is a box in which the trays 7 are accommodated, and the open portion though which the expendable item conveyance portion 8 gets access to the expendable items on the tray 7 is provided to an upper side of the enclosing portion 26. In the same manner as the expendable item cover 25, an open portion through which the expendable item conveyance portion 8 passes the enclosing portion 26 may be provided to a side surface of the enclosing portion 26. In this embodiment, the open portion is provided to a rear side of the enclosing portion 26. As illustrated in FIG. 4A, it is not always necessary that the enclosing portion 26 has a left-and-right symmetrical shape. For example, the enclosing portion 26 may have a shape where a portion of the enclosing portion 26 on a side where a drive portion of the expendable item conveyance portion 8 is disposed is larger. Further, a fitting portion 105 that protrudes in a horizontal direction may be provided to a rear side of the enclosing portion 26. The fitting portion 105 is fitted into a body of the automatic analyzer 1. By providing the fitting portion 105, in mounting the enclosing portion 26 on the body of the automatic analyzer 1, the number of screws for fixing can be reduced.

Figure 3:
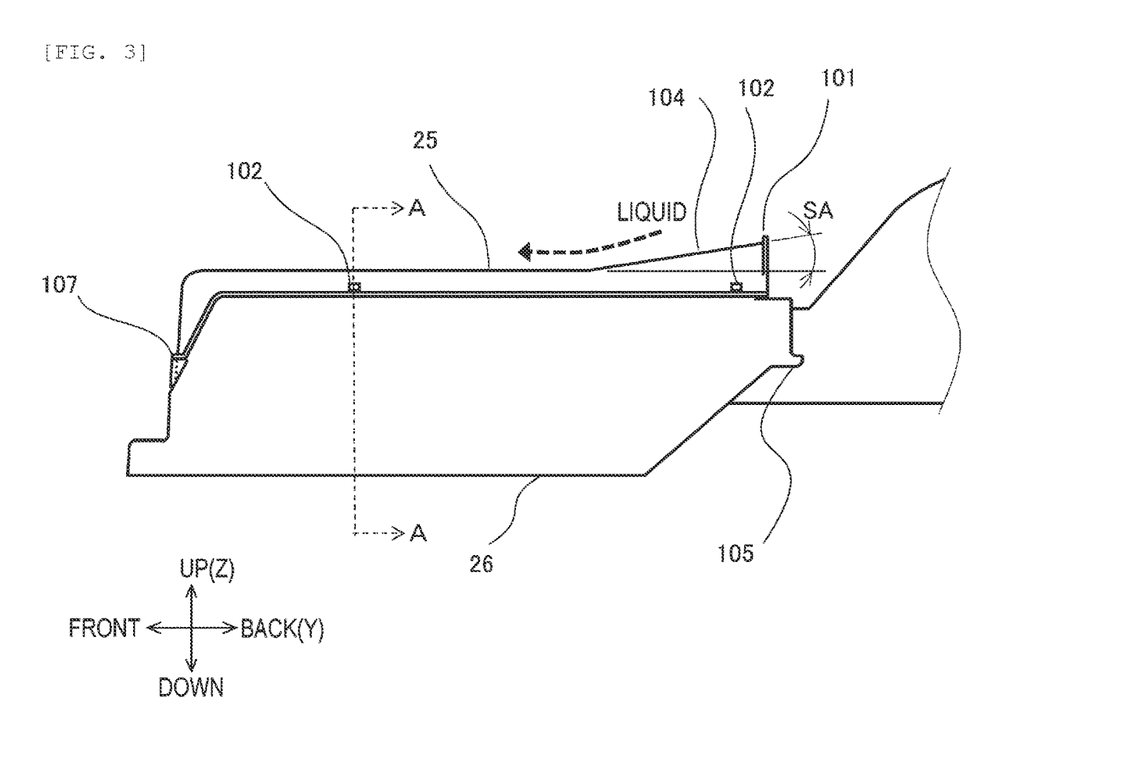
FIG. 3 is a side view illustrating an example of the shape of a expendable item cover.

As illustrated in FIG. 3, an inclined surface 104 that is high on a side of the open portion is provided to an upper surface of the expendable item cover 25. The incubator 9, the tip buffer 11, the specimen dispensing unit 6 and the like are disposed on a rear side of the expendable item cover 25. A rear side of the expendable item cover 25 is also referred to as a direction deeper than the open portion. An inclination angle SA which is an angle made by the inclined surface 104 and the horizontal surface may be set based on restriction such as an upper limit of a height of the expendable item case 100 or the like. The angle is set to 2 degrees, for example. By providing the inclined surface 104, even when the reagent container 3 which is placed on the upper surface of the expendable item cover 25 falls at the time of performing a maintenance operation and a reagent in the reagent container 3 leaks, the leaked reagent does not flow toward the side of the open portion. Further, the inclined surface 104 is inclined such that the reagent does not leak in a direction toward an area where the incubator 9, the tip buffer 11, the specimen dispensing unit 6 and the like are disposed. As a result, accuracy of analysis of a specimen can be maintained.

As illustrated in FIG. 3, a barrier portion 101 which protrudes upward may be provided to an end portion of the expendable item cover 25 at the side of the open portion. By providing the barrier portion 101, even in a case where the inclination angle SA is small so that a liquid that leaks on the expendable item cover 25 flows toward the side of the open portion, the flow of the liquid is stopped by the barrier portion 101.

Figure 4A:
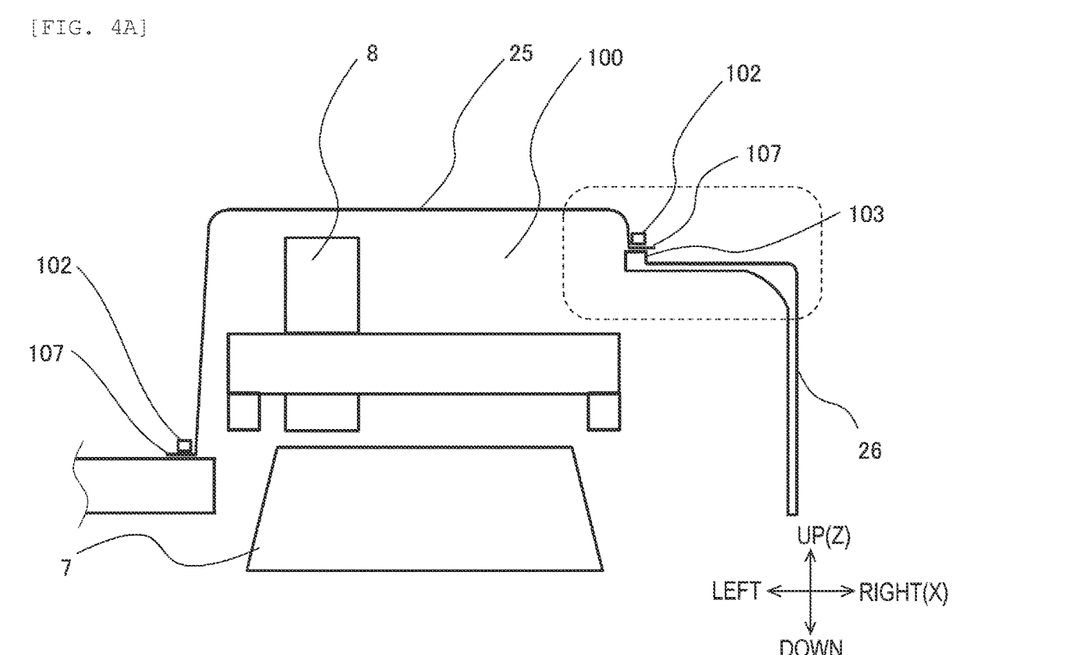
FIG. 4A is a cross-sectional view taken along a line A-A illustrated in FIG. 3.
Figure 4B:
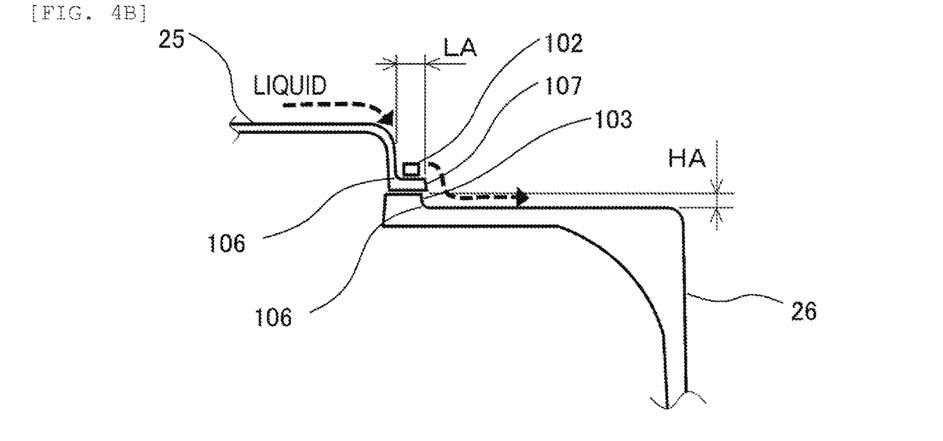
FIG. 4B is an enlarged view of a dotted portion illustrated in FIG. 4A.

As illustrated in FIG. 3, FIG. 4A and FIG. 4B, an eaves portion 107 that protrudes in a horizontal direction may be provided to lower end portions of side surfaces of the expendable item cover 25 to which the open portion is not provided. By providing the eaves portion 107, a mechanical strength of the expendable item cover 25 can be increased. The eaves portion 107 may be fixed to a periphery of the open portion of the enclosing portion 26 by screws 102.

A convex portion 103 having a surface that faces the eaves portion 107 may be provided to a portion of a periphery of an opening of the enclosing portion 26. The convex portion 103 protrudes in an upward direction from an upper surface of the enclosing portion 26, and a stepped portion formed between the convex portion 103 and the upper surface of the enclosing portion 26 is indicated by HA. In a case where the convex portion 103 is provided, it is preferable that the eaves portion 107 protrude more than the convex portion 103 in a horizontal direction. By setting a horizontal direction length LA of the eaves portion 107 longer than a width of the convex portion 103 in a horizontal direction, a leaked liquid flows as indicated by a dotted arrow in FIG. 4B. Accordingly, it is possible to prevent the infiltration of the liquid into the expendable item case 100 through a gap formed between the eaves portion 107 and the convex portion 103. A corner portion 106 having an R shape may be provided to roots of the eaves portion 107 and the convex portion 103 for facilitating cleaning.

Figure 5A:
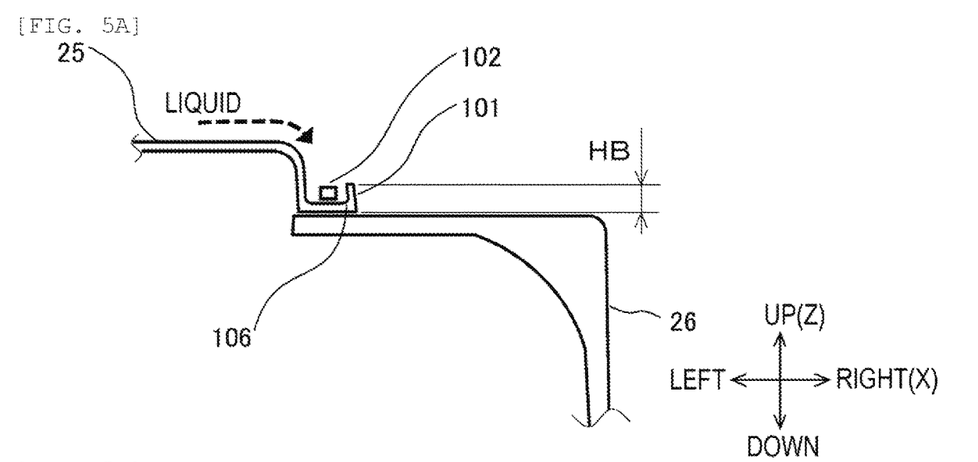
FIG. 5A is a cross-sectional view illustrating another example of the shape of an eaves portion of the expendable item cover.

A modification of the eaves portion 107 is described with reference to FIG. 5A. FIG. 5A illustrates an eaves portion 107 where a barrier portion 101 that protrudes upward is provided to an outer peripheral portion of the eaves portion 107. By providing the barrier portion 101 having a height HB to an outer periphery of the eaves portion 107, the flow of a liquid that leaks on an expendable item cover 25 is stopped by the barrier portion 101 even when the liquid reaches the eaves portion 107. A corner portion 106 having an R shape may be provided to a root of the barrier portion 101 for facilitating cleaning. By forming the corner portion 106 into an R shape, a stress concentration can be alleviated so that a mechanical strength of the barrier portion 101 can be increased.

Figure 5B:
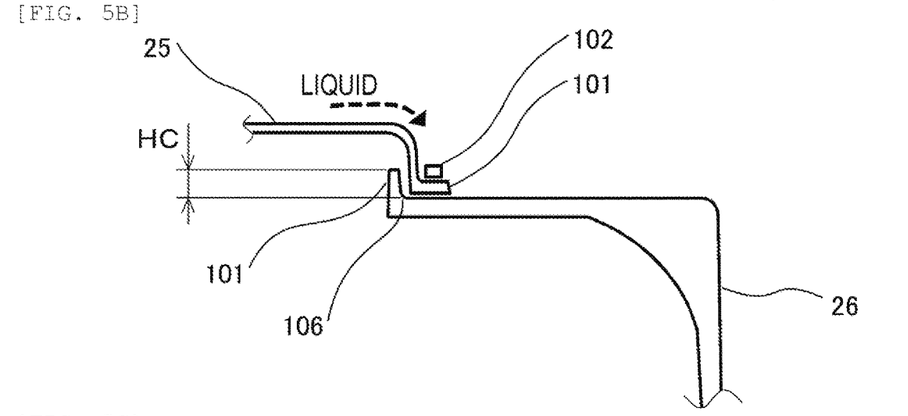
FIG. 5B is a cross-sectional view illustrating an example of the shape of an enclosing portion of an expendable item case.

A modification of the enclosing portion 26 is described with reference to FIG. 5B. FIG. 5B illustrates an enclosing portion 26 where a barrier portion 101 that protrudes upward is provided around an opening. By providing the barrier portion 101 having a height HC around the opening of the enclosing portion 26, the flow of a liquid that leaks on an expendable item cover 25 is stopped by the barrier portion 101 even when the liquid reaches an upper surface of the enclosing portion 26 by way of an eaves portion 107. Further, a corner portion 106 having an R shape may be provided to a root of the barrier portion 101 for facilitating cleaning. It is preferable to form a gap between the barrier portion 101 and the expendable item cover 25 to an extent that a capillary phenomenon does not occur. By forming such a gap, it is possible to prevent the infiltration of the liquid into the expendable item case 100.

Figure 5C:
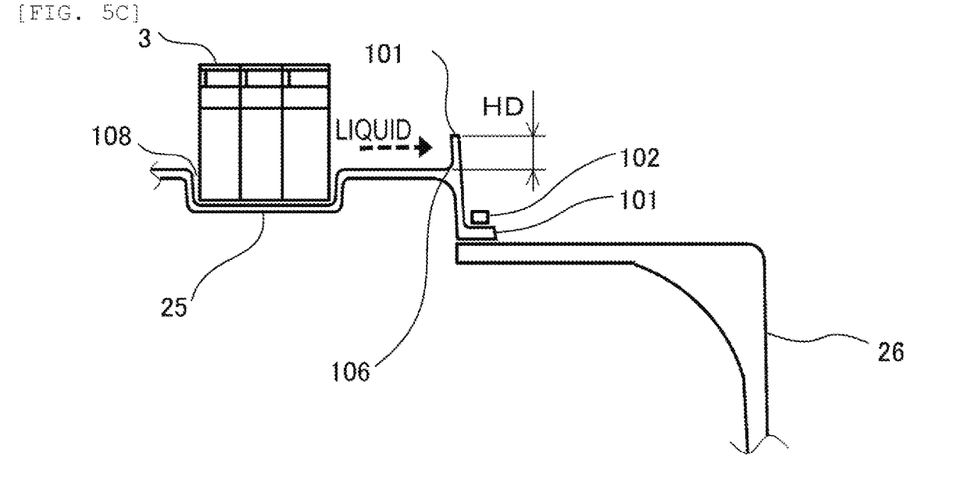
FIG. 5C is a cross-sectional view illustrating another example of the shape of the expendable item cover.

A modification of the expendable item cover 25 is described with reference to FIG. 5C. FIG. 5C illustrates an expendable item cover 25 where a barrier portion 101 that protrudes upward is provided to an outer periphery of an upper surface of the expendable item cover 25. By providing the barrier portion 101 having a height HD on the outer periphery of the upper surface of the expendable item cover 25, the flow of a liquid that leaks on the expendable item cover 25 is stopped by the barrier portion 101 and stays on the upper surface of the expendable item cover 25. A corner portion 106 having an R shape may be provided to a root of the barrier portion 101 for facilitating cleaning.

A hollow 108 into which a reagent container 3 is inserted may be provided to an upper surface of the expendable item cover 25. By inserting the reagent container 3 into the hollow 108, the reagent container 3 is stably placed on the upper surface of the expendable item cover 25 and hence, falling of the reagent container 3 can be suppressed. Further, the hollow 108 is preferably configured such that a length of the hollow 108 in a direction orthogonal to a side surface to which an open portion is provided, that is, the length of the hollow 108 in a longitudinal direction in this embodiment is shorter than a length of a long side of the reagent container 3. By forming the hollow 108 having such a size, the reagent container 3 which is inserted into the hollow 108 is placed such that the side surface to which the open portion is provided and a long side of the reagent container 3 are arranged parallel to each other. Accordingly, a falling direction of the reagent container 3 is limited.

The embodiment of the present invention has been described heretofore. However, the present invention is not limited to the above-mentioned embodiment, and the constitutional elements may be modified without departing from the gist of the present invention. Further, the plurality of constitutional elements disclosed in the above-mentioned embodiment may be suitably combined with each other. Further, some constitutional elements may be deleted from all constitutional elements described in the embodiment.

REFERENCE SIGNS LIST

1: automatic analyzer
2: reagent disk
3: reagent container
4: body cover
5: specimen conveyance path
5a: specimen rack
6: specimen dispensing unit
7: tray
8: expendable item conveyance portion
9: incubator
10: dispensing tip
11: tip buffer
12: tip disposal hole
14: reaction cell
15: reagent dispensing unit
16: stirring portion
17: stirring paddle
18: paddle washing portion
19: reagent nozzle washing portion
20: reagent container loading port
21: reagent disk cover
25: expendable item cover
26: enclosing portion
27: expendable item supply port
30: B/F separation portion
31: detection portion
32: detection portion cover
33: probe
34: magnetism collecting portion
35: washing portion
36: redispersion portion
37: conveyance unit
38: cell disposal hole
100: expendable item case
101: barrier portion
102: screw
103: convex portion
104: inclined surface
105: fitting portion
106: corner portion
107: eaves portion
108: hollow
200: control unit

The invention claimed is:

1. An automatic analyzer comprising:
an analysis unit which analyzes a specimen;
an expendable item case comprising expendable items including a dispensing tip used for dispensing of the specimen and a reaction cell used for reaction between the specimen and a reagent;
an expendable item conveyance portion which conveys the expendable items from the expendable item case to outside of the expendable item case; and
a body cover which covers the analysis unit, the expendable item case, and the expendable item conveyance portion,
wherein the expendable item case includes a tray in which the expendable items are arrayed, and an expendable item cover which covers the tray and in which an open portion through which the expendable item conveyance portion passes is provided on a side surface thereof such that the expendable item conveyance portion moves over the expendable items and under the expendable item cover to access the expendable items, and
the expendable item cover includes a barrier portion protruding upward at an end on a side of the open portion.

2. The automatic analyzer according to claim 1, wherein an inclined surface which is high on a side of the open portion is provided on an upper surface of the expendable item cover.

3. The automatic analyzer according to claim 2, wherein any one of at least an incubator, a tip buffer, and a specimen dispensing unit is disposed behind the side of the open portion.

4. The automatic analyzer according to claim 1, wherein the expendable item cover is provided with an eaves portion protruding in a horizontal direction at a lower end on a side surface on which the open portion is not provided.

5. The automatic analyzer according to claim 4, wherein the expendable item case accommodates the tray and further includes an enclosing portion having an opening on an upper side thereof,
a convex portion having a surface facing a lower surface of the eaves portion is provided around the opening, and
the eaves portion protrudes beyond the convex portion in a horizontal direction.

6. The automatic analyzer according to claim 4, wherein a barrier portion protruding upward is provided at an outer circumferential portion of the eaves portion.

7. The automatic analyzer according to claim 6, wherein a corner portion having an R shape is provided at a root of the eaves portion or a root of the barrier portion.

8. The automatic analyzer according to claim 1, wherein the expendable item case accommodates the tray and further includes an enclosing portion having an opening on an upper side thereof, and a barrier portion protruding upward is provided around the opening.

9. The automatic analyzer according to claim 1, wherein the expendable item cover also has the barrier portion at an end on a side surface on which the open portion is not provided.

10. The automatic analyzer according to claim 1, wherein the expendable item cover includes a hollow on an upper surface thereof, the hollow being a hollow into which a reagent container accommodating the reagent is inserted.

11. The automatic analyzer according to claim 10, wherein
the hollow is configured such that a length in a direction orthogonal to a side surface on which the open portion is provided is shorter than a length of a long side of the reagent container.

12. The automatic analyzer according to claim 1, wherein the reaction cell is conveyed to the outside of the expendable item case on a side of the open portion.

13. An automatic analyzer comprising:
an analysis unit which analyzes a specimen;
an expendable item case comprising expendable items including a dispensing tip used for dispensing of the specimen and a reaction cell used for reaction between the specimen and a reagent;
an expendable item conveyance portion which conveys the expendable items from the expendable item case to outside of the expendable item case; and
a body cover which covers the analysis unit, the expendable item case, and the expendable item conveyance portion,
wherein the expendable item case includes a tray in which the expendable items are arrayed, and an expendable item cover which covers the tray and in which an open portion through which the expendable item conveyance portion passes is provided on a side surface thereof such that the expendable item conveyance portion moves over the expendable items and under the expendable item cover to access the expendable items, and
the expendable item cover is provided with an eaves portion protruding in a horizontal direction at a lower end on a side surface on which the open portion is not provided.

14. The automatic analyzer according to claim 13, wherein
an inclined surface which is high on a side of the open portion is provided on an upper surface of the expendable item cover.

15. The automatic analyzer according to claim 14, wherein
any one of at least an incubator, a tip buffer, and a specimen dispensing unit is disposed behind the side of the open portion.

* * * * *